United States Patent [19]

Pfeffer et al.

[11] 3,912,772

[45] Oct. 14, 1975

[54] PROCESS FOR THE PREPARATION OF α-ALKYL HYDRACRYLIC ACIDS AND α-ALKYL ACRYLIC ACIDS.

[75] Inventors: Philip E. Pfeffer, Warrington; Leonard S. Silbert, Philadelphia, both of Pa.

[73] Assignee: The United States of America as represented by the Secretary of Agriculture, Washington, D.C.

[22] Filed: Oct. 18, 1971

[21] Appl. No.: 190,318

[52] U.S. Cl........ 260/413; 260/343.9; 260/410.9 R; 260/514 R; 260/521 R; 260/535 R
[51] Int. Cl............................................ C08h 17/36
[58] Field of Search............ 260/413, 514 R, 535 R, 260/521 R

[56] References Cited
UNITED STATES PATENTS

| 2,464,768 | 3/1949 | Redmon et al. | 260/486 D |
| 2,951,089 | 8/1960 | Ginsberg et al. | 260/521 R X |
| 3,503,952 | 3/1970 | Caldwell et al. | 260/521 R X |
| 3,652,612 | 3/1972 | Pfeffer et al. | 260/413 |

FOREIGN PATENTS OR APPLICATIONS

| 508,868 | 1/1955 | Canada | 260/521 R |

OTHER PUBLICATIONS

Chem. Abstracts, Vol. 53, 15944b.

Chem. Abstracts, Vol. 52, 9023g.

Kirk–Othmer, Encyclopedia of Chem. Tech., Vol. 13, p. 339.

Chem. Abstracts: 588c, Vol. 62, 1965.

Chem. Abstracts: 68205e, Vol, 68, 1968.

*Primary Examiner*—Lewis Gotts
*Assistant Examiner*—Ethel G. Love
*Attorney, Agent, or Firm*—M. Howard Silverstein; Max D. Hensley; W. E. Scott

[57] ABSTRACT

α-alkyl hydracrylic and α-alkyl acrylic acids are prepared from fatty acids in high yield and high purity by a simple, direct process. The hydracrylic acids are prepared by condensation of formaldehyde with dianions of carboxylic acids using a mixture of tetrahydrofuran and hexamethylphosphoramide as reaction solvent. Dehydration of α-alkyl hydracrylic acid containing at least one α-hydrogen atom in the presence of a dehydrating catalyst such as concentrated phosphoric acid yielded α-alkyl acrylic acid.

15 Claims, No Drawings

PROCESS FOR THE PREPARATION OF α-ALKYL HYDRACRYLIC ACIDS AND α-ALKYL ACRYLIC ACIDS.

A non-exclusive, irrevocable, royalty-free license in the invention herein described, throughout the world for all purposes of the United States Government, with the power to grant sub-licenses for such purposes, is hereby granted to the Government of the United States of America.

This invention relates to the synthesis of α-substituted hydracrylic acids and to the α-substituted acrylic acids derivable therefrom and more particularly to the synthesis of these compounds by the reaction of formaldehyde with dianions prepared from carboxylic acids of the formula.

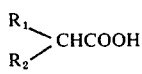

where $R_1$ and $R_2$ are selected from the group consisting of H, saturated alkyl and cycloalkyl, non-conjugated unsaturated alkyl and cycloalkyl, aralkyl, and aryl. For convenience, α-metalated carboxylate salts are hereinafter referred to as dianions.

Substituted hydracrylic and acrylic acids have been made before, but the syntheses were laborious multi-step processes and yields were poor. In fact, the classical methods of Reformatsky [J. Prakt. Chem. 469 (1896)] and Mannich [Ber., 57 1116 (1924)] are still employed when β-hydroxy acids or esters are required. Allen and Kalm, Org. Syn. Coll. Vol. 4, 616 (1963) also describe a multistep procedure which yields β-hydroxy acids or esters in only 35–40% yield.

Attempts to streamline these procedures have been made but the yields have been very discouraging (about 20%). Leathers et al., U.S. Pat. No. 3,051,747 treated lower alkyl acids, that is, when $R_1$ contains one to five C atoms, with formaldehyde and a catalyst in the vapor state at 300°–450°C to obtain low yields of $C_1$ to $C_5$ alkyl-substituted acrylic acids. These processes also required a tenfold excess of the more expensive component, the starting carboxylic acid.

Other workers have disclosed the use of dianions for reaction with selected carbonyl-containing compounds. Hamrich and Hauser [JACS 82 1957 (1960)] used selected ketones with dianions of phenylacetic acid to obtain a limited number of α-phenyl-β-hydroxy acids. Later Angelo [Comp. Rend. 270, 1471 (1970)] extended the reaction to a dianion reacting with one complex aldehyde, $CH_3(CH_2)_6CHO$ and Moersch [J. Org. Chem. 36 1149 (1971)] showed that benzaldehyde would react with certain dianions to give β-phenyl-β-hydroxy-substituted propionic acid derivatives. In no case in the prior art has there been any attempt to condense formaldehyde with dianion carboxylic acid starting materials.

It is an object of this invention to provide a simple, direct process for preparing α-alkyl hydracrylic and α-alkyl acrylic acids in high yield and high purity from fatty acids or esters.

In general, according to this invention, condensations of formaldehyde with dianions prepared from carboxylic acids are surprisingly facile and high in yield, particularly when the dianion is made completely soluble in the reaction medium, such as by employing a mixture of tetrahydrofuran (THF) and hexamethylphosphoramide (HMPA) as the reaction solvent.

The hydracrylic acids formed in the first step of this simple process correspond to the formula

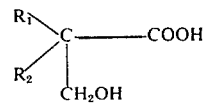

where $R_1$ and $R_2$ are selected from the group consisting of H, saturated alkyl and cycloalkyl, non-conjugated unsaturated alkyl and cycloalkyl, aralkyl, and aryl. The hydracrylic acids result from the reaction of formaldehyde with the α-metalated salt of a carboxylic acid whose structure can be represented as

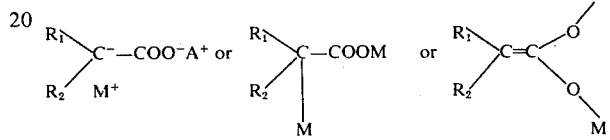

where M is the cation of an active metal like lithium and A is the cation of the same or different active metal, such as lithium and sodium and $R_1$ and $R_2$ are one of the groups just enumerated. It can thus be seen that the active species in our reaction has a double negative charge and is referred to hereinafter as a "dianion": these dianions are the α-carbanions of carboxylic acid salts of the structure

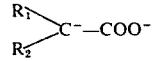

Solutions of this anion react rapidly and smoothly with formaldehyde at moderate temperatures to give very high yields of the corresponding hydracrylic acids (or their salts). These latter are very desirable chemical intermediates. In particular, all these hydracrylic acids having at least one α-hydrogen atom, that is, those with the following structure

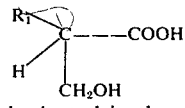

can be directly dehydrated in the second simple step of our process to yield valuable polymerizable, α-substituted acrylic acids of the formula

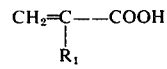

These long chain substituted acrylic acids have been previously unavailable and have great interest in the field of polymer and detergent chemistry. For example, the novel substituted acrylic acids arising from our process can be converted to resins, polymers and copolymers of widely differing and useful properties. Also the hydracrylic acids themselves are valuable polymer building blocks since they contain both a hydroxy-function and a carboxylic acid function and thus can be condensed with themselves to give useful estolide polymers.

The temperature at which the reaction is carried out is also important. Preferred temperatures are in the range from 25° to 75°C downward with 45°C an optimum. Higher temperatures lead to decomposition of the dianion starting material, and excessively low temperatures slow down the process to an undesirable degree.

Several methods of preparation of the α-metalated starting materials are known, [P. L. Creger JACS 89, 2500 (1967) and Pfeffer and Silbert, J. Org. Chem. 35, 262 (1970)] but the best method involves the use of lithium as the metalating agent in the form of the lithium derivative of di-isopropylamine. This dianion reagent and its subsequent reaction with dry gaseous formaldehyde (in solution) must be handled under an inert, dry atmosphere to prevent undesirable side reactions. For this purpose, dry nitrogen gas is suitable, but other inert gases such as helium are also satisfactory.

If it is desired to isolate and utilize the hydracrylic acid resulting from the first stage of this reaction, the reaction mixture (of dianion and formaldehyde), can be acidified and extracted with ether or other suitable solvent and the hydracrylic acid recovered by removal of the solvent.

The second tage of the process of this invention, that is, to produce dehydration of hydracrylic acid containing at least one α-hydrogen atom to acrylic acid, is depicted in the following equation.

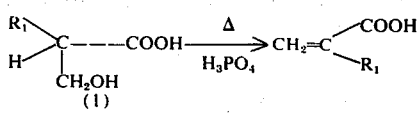

It is only necessary to heat in vacuo the acidified product (1) from the first stage of this process to about 150°-250°C. (180°C. is optimum) for about 30 minutes in the presence of a typical dehydrating catalyst such as concentrated phosphoric acid to effect estolide formation and then increase the temperature in the reactor to about 270°C. and reduce the pressure to about 0.1mm. Under these conditions the desired acrylic acid derivative is formed from the decomposition of the esterolide and distills directly from the reaction vessel (the acrylic acid always boils at a lower temperature than its hydracrylic acid analog). A convenient procedure for the dehydration stage is to mix with the hydracrylic acid about 1% of syrupy phosphoric acid and heat the mixture in vacuo at about 250° until the acrylic acid distills off. The product in each stage is obtained in yields of 90% or greater.

EXAMPLE 1

To 150 ml of anhydrous tetrahydrofuran containing 8.2 g (0.082 moles) of di-isopropylamine in a glass reactor, there was added with stirring 51.3 ml of 1.6 M n-butyllithium in dry hexane under an atmosphere of dry nitrogen. Then 8.86 g (0.39 moles) of tetradecanoic (myristic) acid was added along with 7.05 g (0.039 moles) of HMPA resulting in a transparent yellow solution. The metalation reaction was carried out for 1 hour at 45°C, resulting in a clear solution. An excess of dry formaldehyde gas (from 18 g of paraformaldehyde heated to 180°-200°C) was then passed into the stirred reactor during one-half hour. The reaction mixture was treated with dilute HCl, then extracted with ether. The ether extracts were washed three times with dilute HCl to remove traces of HMPA. The ether was stripped off to yield 4.1 g of solid (89% yield) α-dodecylhydracrylic acid. After two recrystallizations from hexane it melted at 75°-75.3°C and analyzed correctly as to C and H. Gas-liquid phase chromatrograpy (glpc) showed it to be over 98% pure.

A procedure similar to that in Example 1 was used in Examples 2 through 7.

EXAMPLE 2

Started with 10.0 g (0.039 moles) of hexadecanoic (palmitic) acid and 0.078 moles of HMPA (2 moles per mole of palmitic acid). The yield was 9.0 g of α-tetradecylhydracrylic acid (81% of theory) which melted at 81°-81.7°C.

EXAMPLE 3

Started with 11.10 g (0.039 moles of octadecanoic (stearic) acid and 0.078 moles of HMPA. The yield was 9.0 g (81% of theory) of α-hexadecylhydracrylic acid which melted at 85.5°-87.0°C.

EXAMPLE 4

Started with 11.0 g (0.039 moles) of cis-9,10-octadecenoic (oleic) acid and 0.039 moles of HMPA. The yield was 11.0 g (93% of theory) of the desired α-cis-7,8-hexadecenylhydracrylic acid. Its methyl ester decomposed when vacuum distillation was attempted.

EXAMPLE 5

Started with 5.8 g (0.05 moles) of hexanoic acid. No HMPA was needed. The yield was 7.1 g (97% of theory) of α-butyl-hydracrylic acid.

EXAMPLE 6

Started with 8.0g (0.05 moles) of nonanoic acid. No HMPA was needed. The yield was 9.0g (96% of theory) of α-heptylhydracrylic acid.

EXAMPLE 7

Started with 5.2g (0.0192 moles) of 2-heptyldecanoic acid. No HMPA was needed. The metalation was carried out for 2 hours at 50°C. The yield was 5.0g (91% of theory) of α-heptyl, α-octylhydracrylic acid.

EXAMPLE 8

The α-substituted hydracrylic acids containing at least one α-hydrogen atom were converted to the corresponding acrylic acids as follows: to the product from Example 1 was added about 1% of concentrated phosphoric acid and the mixture heated in vacuo at 180°C. for 30 minutes. The temperature was then raised to 270°C. to pyrolyze the estolides formed at 180°C. The desired α-dodecylacrylic acid distilled off at 157°C. in 90% yield as the pressure was reduced down to 0.2 mm. The product melted at 44°-45°C.

EXAMPLE 9

The product from Example 2 was treated in a manner similar to that in Example 8. The α-tetradecylacrylic acid was obtained in 84% yield and melted at 55°-55.8°C.

EXAMPLE 10

The product from Example 3 was treated in a manner similar to that in Example 8. α-Hexadecylacrylic acid distilled at 205°–209°C/0.25 mm and melted at 60°–61°C. It was obtained in 90% yield.

EXAMPLE 11

The product from Example 4 was treated in a manner similar to that in Example 8. The α-cis-7,8-hexadecenylacrylic acid distilled at 196°–197°C/0.4 mm. It was obtained in 90% yield.

EXAMPLE 12

The product from Example 5 was treated in a manner similar to that in Example 8. The α-butylacrylic acid was obtained in 94% yield.

EXAMPLE 13

The product from Example 6 was treated in a manner similar to that in Example 8. The α-heptylacrylic acid was obtained in 94% yield.

We claim:

1. A process for the preparation of α-substituted hydracrylic acids comprising reacting formaldehyde with a lithium α-lithio carboxylate of a corresponding acid selected from the group consisting of saturated and non-conjugated, unsaturated alkanoic acids.

2. A process for the preparation of α-substituted hydracrylic acids comprising passing an excess of dry gaseous formaldehyde into a stirred solution of α-lithiated carboxylic acid salt over a period of about 30 minutes, treating the reaction mixture with dilute hydrochloric acid, extracting the acidified reaction mixture with ethyl ether and then removing the ethyl ether to recover the product.

3. The process of claim 2 wherein the α-lithiated carboxylic acid is a derivative of myristic acid.

4. The process of claim 2 wherein the α-lithiated carboxylic acid is a derivative of palmitic acid.

5. The process of claim 2 wherein the α-lithiated carboxylic acid is a derivative of stearic acid.

6. The process of claim 2 wherein the α-lithiated carboxylic acid is a derivative of oleic acid.

7. α-Dodecylhydracrylic acid

8. α-Tetradecylhydracrylic acid

9. α-Hexadecylhydracrylic acid

10. α-cis-7, 8-Hexadecenylhydracrylic acid

11. α-Dodecylacrylic acid

12. α-Tetradecylacrylic acid

13. α-Hexadecylacrylic acid

14. α-cis-7,8-Hexadecenylacrylic acid

15. α-Heptyl, α-octylhydracrylic acid

* * * * *